3,728,128
PREPARATION OF A BLAND WHEY PRODUCT
Anthony J. Luksas, Chicago, Ill., assignor to
Beatrice Foods Co., Chicago, Ill.
No Drawing. Continuation-in-part of abandoned application Ser. No. 737,803, June 18, 1968. This application Oct. 5, 1970, Ser. No. 78,306
Int. Cl. A23c 21/00
U.S. Cl. 99—57       8 Claims

ABSTRACT OF THE DISCLOSURE

The objectionable odors and tastes of whey are removed therefrom and a bland whey product is produced by growing yeasts in a fluid whey system containing at least 10 p.p.m. of dissolved oxygen to substantially prevent fermentation and provide assimilation.

---

This is a continuation-in-part of U.S. application Ser. No. 737,803, filed June 18, 1968, entitled Bland Whey product, now abandoned.

The present invention relates to a whey product which is essentially devoid of the characteristic disagreeable whey odor and flavor and to a process for the production thereof.

Whey derived from the fermentation of milk, cream, etc. in the production of cheeses, after separation of the curds from the fermented product, has a characteristic disagreeable odor and flavor. While the particular disagreeable odor and flavor varies somewhat with the particular cheese being produced by the fermentation process, nevertheless the fermentation process of producing cheese curds always results in a whey of a disagreeable odor and flavor. Since large amounts of cheese are produced each year, correspondingly large amounts of whey are also produced. Most of this whey has only presented a disposal problem and has not been utilized in producing valuable food products, due to the disagreeable odor and flavor. Some whey has been utilized in specialized processes such as those for producing vitamins, alcoholic beverages, animal feeds, etc. However, the amount of whey used in these specialized processes has been comparatively small.

As can be appreciated, if a process could be devised to economically convert the whey into a product without the disagreeable odor and flavor, whey would be a cheap source of very nutritional foodstuff. Some efforts in the art in this regard have been made and with varying degrees of success. These processes, generally speaking, have been successful in reducing the disagreeable odor and/or flavor to some extent or have somewhat changed the disagreeable odor and flavor to a more agreeable odor and flavor. Hence, these processes result in a whey product which can only be used, to an acceptable extent, in foods where the remaining whey odor and flavor or more agreeable odor and flavor can be substantially masked by the natural relatively heavy flavor of the food. Therefore, the whey products of these processes still find only relatively limited uses in terms of foods in which they may be incorporated and in terms of the total quantity that is so used.

It is therefore quite apparent that if a process could be devised which not only removed the disagreeable odors and flavors of whey but removed most of the odors and flavors, i.e. a bland whey product, the resulting whey product would not be limited to use in foods having a relatively heavy masking odor and flavor but could be widely used in lightly flavored as well as heavily flavored food products and constitute a valuable source of economical nutrition.

Accordingly, it is an object of this invention to provide a process for producing a bland whey product and to provide a bland whey product for use in foods for human consumption. Other objects will be apparent from the following disclosure and claims.

Briefly stated, it has now been discovered that whey may be converted into a bland whey product by inoculating whey with a yeast, supplying air and/or oxygen to the inoculated whey in amounts sufficient that the yeast grows in the whey and deflavors the whey by essentially an assimilation of the objectionable odor and flavor compounds.

As can be immediately recognized, the present process, in its broadest form, departs radically from prior art processes in that the action of the yeast on the fluid whey is by assimilation of the unwanted compounds therein and not by fermentation. This is accomplished by supplying to the yeast inoculated whey sufficient air and/or oxygen that essentially assimilation occurs, instead of the prior art fermentation of the certain portions of the whey composition by the yeast.

At this point it is important to clearly distinguish between assimilation and fermentation by the yeast. First of all fermentation proceeds to its final products through an entirely different set of mechanisms as compared with assimilation. Secondly, fermentation, generally, proceeds by acting on sugars or sugar producing components in the whey, while assimilation is not so limited. Assimilation may use a wide variety of components in the whey, with or without using the sugar or sugar producing components, as will be more fully explained below. Thirdly, fermentation results in the major proportions of $CO_2$ and ethyl alcohol, among other things such as aldehydes, ketones, fusel oils and the like, while assimilation results in major proportions of $CO_2$ and water, instead of alcohol and related compounds. Fourthly, assimilation requires that a substantially higher concentration of dissolved oxygen be available, than does a fermentation. Lastly, since the whey starting material, yeast inoculant and temperatures may be essentially the same in an assimilation process as in a fermentation process, it is important that very special and very critical conditions are imposed in order to insure that assimilation will take place, and that substantially no fermentation takes place.

In this latter regard, the oxygen level in the inoculated whey is most critical. When whey is inoculated with a yeast and maintained under conventional growth conditions, there is an initial time period where the total number of yeast cells in the whey, assuming a conventional level of yeast introduced into the whey by the inoculation, is relatively small and no appreciable change in the whey takes place. This is referred to as the "lag" period and it may vary from about 1 to 5 hours, depending on the inoculation level of yeast cells. Since the yeast growth and hence number of yeast cells with time follows a generally exponential behavior, after this "lag" period the growth rate and number of yeast cells increase quite rapidly. Hence, during the "lag" period, of relatively little growth, the oxygen content of the whey, with or without aeration, may be quite close to the maximum amount of oxygen that can be dissolved by the fluid whey, i.e. approximately 160 parts per million by volume (p.p.m.). However, after this "lag" period and when substantial growth of the yeast cells begins, the oxygen content in p.p.m. drops most rapidly, as the growing yeast cells use the available dissolved oxygen, and within a relatively short time the oxygen content will drop to about 1 p.p.m. under conventional conditions.

With conventional "fermenters" (vessels used to ferment materials) air is supplied to the medium by way of stirring and/or bubbing air through the medium. However, with these conventional "fermenters," air cannot be introduced into the medium during the rapid growth period at a rate sufficient to significantly exceed the 1 p.p.m. level of dissolved oxygen, since unacceptable frothing and overfoaming of the medium would result. Hence in conventional "fermenters," the yeast essentially acts on the whey by fermentation.

In order to move the action of the yeast from essential fermentation, after the "lag" period, toward significant amounts of assimilation, it is most critical that the whey medium contain at least about 5 p.p.m. of dissolved oxygen, although this value will vary slightly with particular systems. At about 5 p.p.m. of dissolved oxygen significant amounts of assimilation take place, although fermentation still takes place at this oxygen level. Between about 5 p.p.m. and about 10 p.p.m. of dissolved oxygen, an unstable region exists where the action is a combination of fermentation and assimilation with increasing proportions of the latter as the dissolved oxygen level goes from about 5 p.p.m. toward the 10 p.p.m. level. At about 10 p.p.m. the action of the yeast is essentially that of assimilation.

As noted above, conventional "fermenters" cannot supply air at sufficient rates during the rapid growth period to raise the dissolved oxygen content of a normal fluid yeast/whey medium to that required to produce significant assimilation by the rapidly growing yeast. There are, however, very specialized vessels with special defoaming apparatus, which are known to the art, wherein dissolved oxygen contents can be increased without the unacceptable frothing and overfoam of conventional fermenters.

Hence, with these specialized vessels the present assimilation process may be carried out with air as the oxygen source and, by careful control, dissolved oxygen contents of over 5 p.p.m. up to about 10 p.p.m. can be achieved in the present fluid yeast/whey medium. However, for easier operation, it is preferred that at least part of the oxygen source is molecular oxygen, which allows oxygen contents in the yeast/whey medium of about 10 p.p.m. or higher. Generally, about at least 20% by volume of the air is, preferably, replaced by molecular oxygen. Also, conventional "fermenters" may be used if the air which is normally bubbled through the medium is replaced, at least in part, e.g. in a major proportion, with molecular oxygen, e.g. about 50% or more by volume.

Therefore, irrespective of what physical means are used to effect assimilation, provisions such as those noted above must be made to insure that after the "lag" period the dissolved oxygen content of the whey medium does not fall below about 5 p.p.m. However, to insure that the action of the yeast on the whey is essentially assimilation, the oxygen content should not fall below about 10 p.p.m.

In order to assure that essentially assimilation occurs, two tests should be made on the fluid yeast/whey medium. First, the dissolved oxygen content should be monitored, preferably continuously, by a suitable oxygen analyzer. While many such analyzers are available, the Process Oxygen Analyzer, model 778, manufactured by the Beckman Instrument Company, Inc. is quite suitable for this purpose. The probe on the analyzer is inserted into any convenient portion of the fluid yeast/whey medium and a continuous check of the dissolved oxygen may be made. Secondly, especially if any doubt exists as to the proper level of oxygen required in any particular yeast/whey system for insuring that essentially assimilation is occurring, an analysis for ethyl alcohol should be made. The absence of any substantial amounts of ethyl alcohol confirms that substantially only assimilation is occurring.

From the above, it is clear that while minor amounts of fermentation can be tolerated, the process should be essentially that of assimilation. Further, it is clear that the above critical oxygen contents must be observed and that special conditions must be imposed on the conventional fluid yeast/whey systems in order to obtain such oxygen contents. Unless these special conditions are imposed, the action will be essentially fermentation and not essentially assimilation. Hence, whether air, molecular oxygen or a combination thereof is used as the oxygen source and irrespective of what particular apparatus is used, the critical assimilation conditions must be imposed on the conventional yeast/whey system to provide a bland whey product. As a further reference the assimilation action is also known as the "Pasteur effect."

Whey, derived from fermentation, e.g. cheese making, contains a host of compounds which contribute to the disagreeable odor and flavor. Representative of the compounds are ethyl alcohol, lactic acid, acetaldehyde, ethyl acetate, phenol, cresols, terpenes, isopreneoids, diacetyl and short chain fatty acids, along with various nitrogen and sulfur compounds. The assimilation action has the ability to act on these compounds containing oxygen, hydrogen and carbon, along with some ability to assimilate compounds other than carbohydrates, especially certain nitrogen containing compounds, to break the compounds down to $CO_2$ and water; therefore, assimilation is not limited to essentially acting on sugars and sugar producing compounds to form $CO_2$ and alcohols (and related compounds) as is fermentation. Hence, assimilation can remove not only essentially all of the disagreeable odors and flavors but essentially all odors and flavors and produce a bland product.

Conventional yeast may be used in the process, e.g. *Saccharomyces cerevisiae*, *Saccharomyces unisporum* (also known as *Saccharomyces debrueckii*), *Saccharomyces fragilis* and *Saccharomyces lactis*. Preferably, the whey is first pasteurized in conventional manners to eliminate pathogens or contaminating organisms. The heating can be at 145° F. for 30 minutes, 180° F. for 20–30 minutes, 310° F. for 1 to 20 seconds, 300° F. for 15 seconds, or 275° F. for 15 seconds for example.

During the yeast growth period the system is fluid, and is aerated and agitated as noted above. The air and/or oxygen is intimately mixed into the system in any convenient method as noted above, but a high speed impeller and bubbling of the air and/or oxygen is preferred. The air and/or oxygen is bubbled through the medium throughout the growth period. Growth is continued at conventional temperatures, preferably at 78.8° F. although temperatures as low as room temperature (e.g. 68° F.) or as high as 90° F. or above can be used. The product is then pasteurized to destroy the yeast and is then dried, e.g. by spray drying or roller drying. The product of the present invention dries easily as opposed to the original whey which does not dry well.

The total time required to carry out the assimilation will vary somewhat depending on the "lag" time and the "lag" time depends on the level of inoculation, as well as temperature. However, with conventional levels of inoculation, e.g. 0.1 to 10% by volume of inoculant per volume of whey with 1,000 to about $10^4$ yeast cells/cc. of inoculant, the lag period will generally be between about 1 to 5 hours. After the lag period, the rapid growth times will generally vary between about 12 to 24 hours. However, this growth period can vary somewhat within conventional temperatures, as noted above, but in any event will be essentially complete when there is a distinct increase in oxygen content of the system, which indicates that the yeast has assimilated the unwanted compounds, noted above, and no longer requires large amounts of oxygen. At this point the oxygen demand of the yeast is greatly reduced and the same oxygen feed rates will therefore simply increase the dissolved oxygen content, which shows that the assimilation is essentially complete. Hence, rapid growth periods of at least 12 hours are generally required to produce whey products having an acceptable bland taste after the growth is essentially complete the oxygen supply should be terminated, since keeping the whey product in a high oxygen content fluid for extended times after growth is complete will cause unwanted off-tastes.

EXAMPLE 1

Into a vessel having a gas bubbling mechanism at the bottom thereof, a high speed impeller disposed therein, a mechanical defoamer at the top and a Beckman oxygen analyzer attached, all of conventional design, is added cheddar cheese whey and heated to 145° F. for 30 minutes. The whey is heated to about 79° F. and inoculated with 3% by volume of $10^3$/cc. *Saccharomyces fragilis.* Air is slowly introduced. The dissolved oxygen content of the whey is continuously analyzed. After about 15 minutes the oxygen content is about 160 p.p.m. and then begins to slowly drop. The amount of air is increased as the oxygen content continues to drop. After about 2 hours, the oxygen content begins dropping rapidly and the air rate is likewise increased rapidly to maintain a dissolved oxygen level of about 15 p.p.m.. After about 13 hours the system drops to an oxygen content of about 12 p.p.m. and stabilizes at that point. The rate of air introduced is about 5 volumes of air per minute per volume of whey. At these high air rates the mechanical defoamer on the vessel is used to prevent frothing and overfoaming. After about 15 hours after the "lag" period, the oxygen content begins to distinctly increase and the air is discontinued. The medium is then pasteurized at 145° F. for 30 minutes. The product is then homogenized at 2,000 p.s.i. and spray dried in a convention tower at conventional conditions. The dried product is a bland tasting powder and when used in place of milk in a baked bread gives no appreciable taste thereto. Likewise, the product could be incorporated into vanilla ice cream, candy, reconstituted milk without imparting any appreciable taste thereto.

EXAMPLE 2

The procedure of Example 1 is repeated, except that molecular oxygen replaces the air and only about 1 volume of oxygen per volume of whey is required to maintain the oxygen content at 12 p.p.m. Also, it is not necessary to use the mechanical defoamers. The product produced is essentially the same as in Example 1.

EXAMPLE 3

Example 1 is repeated except that the air is mixed in equal volumetric proportions with molecular oxygen, and the rate of addition thereof is about 2 volumes/volume of whey to maintain a 12 p.p.m. oxygen content. It is not necessary to use the mechanical defoamers. The resulting product is essentially the same as in Example 1.

EXAMPLE 4

Example 1 is repeated except that a conventional "fermenter" vessel, without a mechanical defoamer, is used. Again, the fermenter is fitted with an oxygen analyzer. Air is introduced at the maximum rate through the bubbling mechanism consistent with preventing overfoaming. The stable oxygen content is about 1 p.p.m. Relatively large amounts of ethyl alcohol are detected. The dried product, while less disagreeable in odor and taste than whey, is distinctly flavored and presents an acid after-taste. When used in the same manner and same foods as in Example 1, each food presents an unusual taste, not normally found in the food, and not unacceptable for general use.

EXAMPLE 5

The procedure of Example 4 is repeated, except that 10% by volume of the air is replaced by molecular oxygen. The stable oxygen content is about 4 parts p.p.m. The same foods of Example 1 made with the resulting product have less unusual tastes than those of Example 4 but are still unacceptable.

EXAMPLE 6

Example 3 is repeated with various ratios of air to molecular oxygen to produce stable oxygen contents of 5, 7, 9 and 11 p.p.m. of dissolved oxygen in the medium. The same foods of Example 1 exhibit flavors from marginally acceptable at 5 p.p.m. oxygen in the medium, to almost no detectable foreign flavor at 9 p.p.m. to no detectable foreign flavor at 11 p.p.m.

What is claimed is:

1. In a process for mitigating the objectionable odors and tastes of whey comprising growing yeast in a fluid whey system while supplying to the fluid whey system sufficient oxygen that the dissolved oxygen content of the fluid system, after the lag period, is maintained at about at least 10 p.p.m. during the entire growth period of the yeast, growing the yeast at said oxygen concentration until there is a distinct increase in oxygen content of the fluid system, and then terminating the growth of the yeast by pasteurization, whereby the yeast grows essentially by assimilation and without substantial fermentation and without any substantial production of alcohol and the objectionable odors and tastes of the whey are removed to produce a bland whey product.

2. The process of claim 1, wherein the yeast is selected from the group consisting of *Saccharomyces cerevisiae, Saccharomyces unisporum, Saccharomyces fragilis* and *Saccharomyces lactis.*

3. The process of claim 2, wherein the growth is carried out at temperatures between 68° F. and 90° F.

4. The process of claim 1, wherein the growth product is dried.

5. The process of claim 1 wherein the oxygen source is air.

6. The process of claim 1 wherein the oxygen source is molecular oxygen.

7. The process of claim 1 wherein the oxygen source is a mixture of air and molecular oxygen.

8. The product produced by the process of claim 1.

References Cited

UNITED STATES PATENTS

| | | | |
|---|---|---|---|
| 2,128,845 | 8/1938 | Myers et al. | 99—59 |
| 2,449,064 | 9/1948 | Engel | 99—35 |
| 3,345,179 | 10/1967 | Pollock et al. | 99—31 |
| 3,057,785 | 10/1962 | Olsen | 195—109 X |
| 3,558,328 | 1/1971 | Luksas | 99—57 |
| 2,681,858 | 6/1954 | Stimpson | 99—55 |
| 2,809,113 | 10/1957 | Stimpson et al. | 195—57 X |
| 3,384,553 | 5/1968 | Caslavsky et al. | 195—109 X |

A. LOUIS MONACELL, Primary Examiner

D. M. NAFF, Assistant Examiner

U.S. Cl. X.R.

99—59, 96; 195—82, 109